United States Patent
Revach et al.

(10) Patent No.: US 11,681,674 B2
(45) Date of Patent: Jun. 20, 2023

(54) CONSOLIDATED METADATA IN DATABASES

(71) Applicant: ENTIT Software LLC, Sunnyvale, CA (US)

(72) Inventors: Eli Revach, Yehud (IL); Mordechai Lehrer, Yehud (IL); Amos Nesher, Yehud (IL); Elad Levi, Yehud (IL)

(73) Assignee: MICRO FOCUS LLC, Sanford, NC (US)

( * ) Notice: Subject to any disclaimer, the term of this patent is extended or adjusted under 35 U.S.C. 154(b) by 1007 days.

(21) Appl. No.: 15/564,272

(22) PCT Filed: Apr. 30, 2015

(86) PCT No.: PCT/US2015/028648
§ 371 (c)(1),
(2) Date: Oct. 4, 2017

(87) PCT Pub. No.: WO2016/175861
PCT Pub. Date: Nov. 3, 2016

(65) Prior Publication Data
US 2019/0266140 A1 Aug. 29, 2019

(51) Int. Cl.
*G06F 16/22* (2019.01)
*G06F 16/242* (2019.01)
*G06F 16/245* (2019.01)

(52) U.S. Cl.
CPC ........ *G06F 16/221* (2019.01); *G06F 16/2237* (2019.01); *G06F 16/2282* (2019.01); *G06F 16/242* (2019.01); *G06F 16/245* (2019.01)

(58) Field of Classification Search
CPC .. G06F 16/221; G06F 16/2237; G06F 16/242; G06F 16/245
USPC ....................................................... 707/696
See application file for complete search history.

(56) References Cited

U.S. PATENT DOCUMENTS

| | | | |
|---|---|---|---|
| 6,345,272 B1* | 2/2002 | Witkowski | G06F 16/24539 707/759 |
| 6,581,064 B1* | 6/2003 | Senjalia | G06F 16/21 |
| 9,294,361 B1* | 3/2016 | Choudhary | G06Q 10/06393 |
| 2003/0088584 A1* | 5/2003 | Lau | G06F 16/289 |
| 2003/0212694 A1 | 11/2003 | Potapov et al. | |
| 2007/0050381 A1 | 3/2007 | Hu et al. | |
| 2007/0100911 A1* | 5/2007 | Barsness | G06F 16/217 |
| 2007/0282864 A1 | 12/2007 | Parees et al. | |
| 2008/0059412 A1 | 3/2008 | Tarin | |
| 2009/0044095 A1* | 2/2009 | Berger | G06F 16/258 715/226 |
| 2009/0313210 A1* | 12/2009 | Bestgen | G06F 16/2237 |

(Continued)

FOREIGN PATENT DOCUMENTS

WO WO-2015042072 3/2015

OTHER PUBLICATIONS

International Searching Authority, International Search Report and Written Opinion, dated Jan. 28, 2016, 9pgs.

(Continued)

*Primary Examiner* — Allen S Lin

(57) ABSTRACT

A database having multiple data columns is disclosed. Whether metadata for the multiple data columns resides in multiple different metadata columns may be determined. If so, the metadata may be consolidated into a single consolidated metadata column.

19 Claims, 6 Drawing Sheets

(56) References Cited

U.S. PATENT DOCUMENTS

| | | |
|---|---|---|
| 2010/0042587 A1 | 2/2010 | Johnson et al. |
| 2010/0250504 A1 | 9/2010 | Balasubramanian et al. |
| 2011/0219020 A1 | 9/2011 | Oks et al. |
| 2012/0296883 A1 | 11/2012 | Ganesh et al. |
| 2013/0054605 A1* | 2/2013 | Yeh ................. G06F 16/258 707/740 |
| 2013/0151692 A1 | 6/2013 | White |
| 2014/0201129 A1 | 7/2014 | Gupta |
| 2015/0081717 A1* | 3/2015 | Pidduck ............. G06F 16/38 707/741 |
| 2016/0078089 A1* | 3/2016 | Hu ..................... G06F 16/21 707/714 |

OTHER PUBLICATIONS

Sidirourgos, L. et al., Column Imprints: a Secondary Index Structure, (Research Paper), Nov. 14, 2011. 12 pgs.

\* cited by examiner

| 102a ↓ | 104a ↓ | 102b ↓ | 104b ↓ | 102c ↓ | 104c ↓ |
|---|---|---|---|---|---|
| DATA COLUMN A | METADATA COLUMN A | DATA COLUMN B | METADATA COLUMN B | DATA COLUMN C | METADATA COLUMN C |
| Ad1 | Am1 | Bd1 | Bm1 | Cd1 | Cm1 |
| Ad2 | Am2 | Bd2 | Bm2 | Cd2 | Cm2 |
| ------ | ------ | ------ | ------ | ------ | ------ |
| Adn | Amn | Bdn | Bmn | Cdn | Cmn |

| 106a ↓ | 106b ↓ | 106c ↓ | 108 ↓ |
|---|---|---|---|
| DATA COLUMN A | DATA COLUMN B | DATA COLUMN C | CONSOLIDATED METADATA COLUMN |
| Ad1 | Bd1 | Cd1 | {Am1, Bm1, Cm1} ← 110_1 |
| Ad2 | Bd2 | Cd2 | {Am2, Bm2, Cm2} ← 110_2 |
| ------ | ------ | ------ | ------ |
| Adn | Bdn | Cdn | {Amn, Bmn, Cmn} ← 110_n |

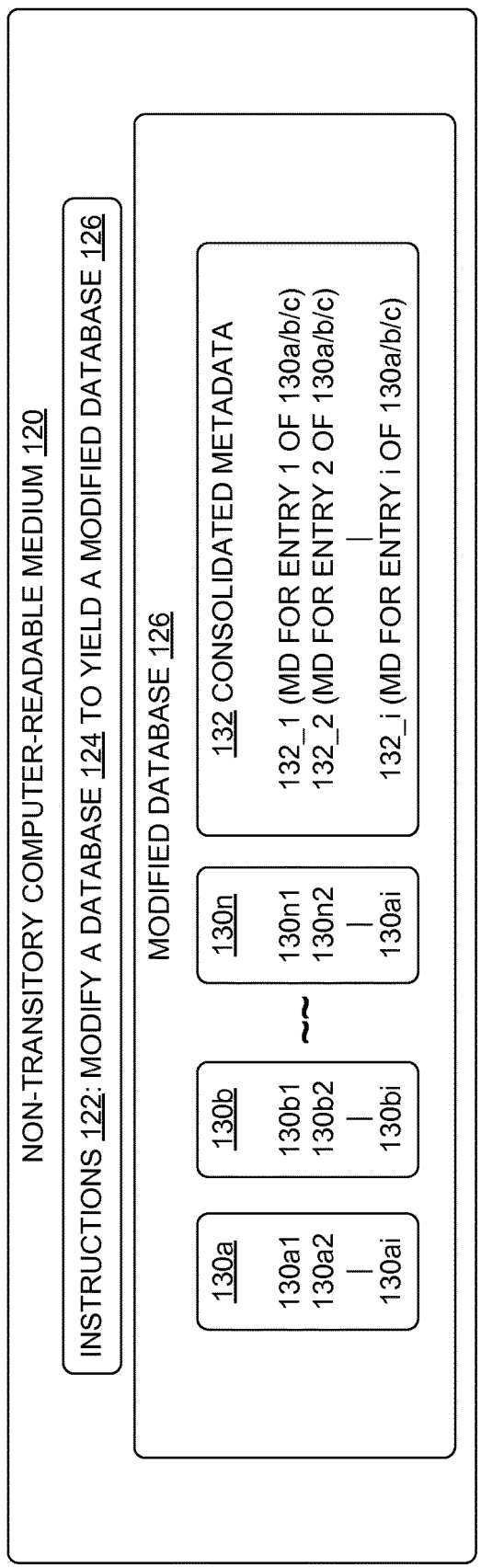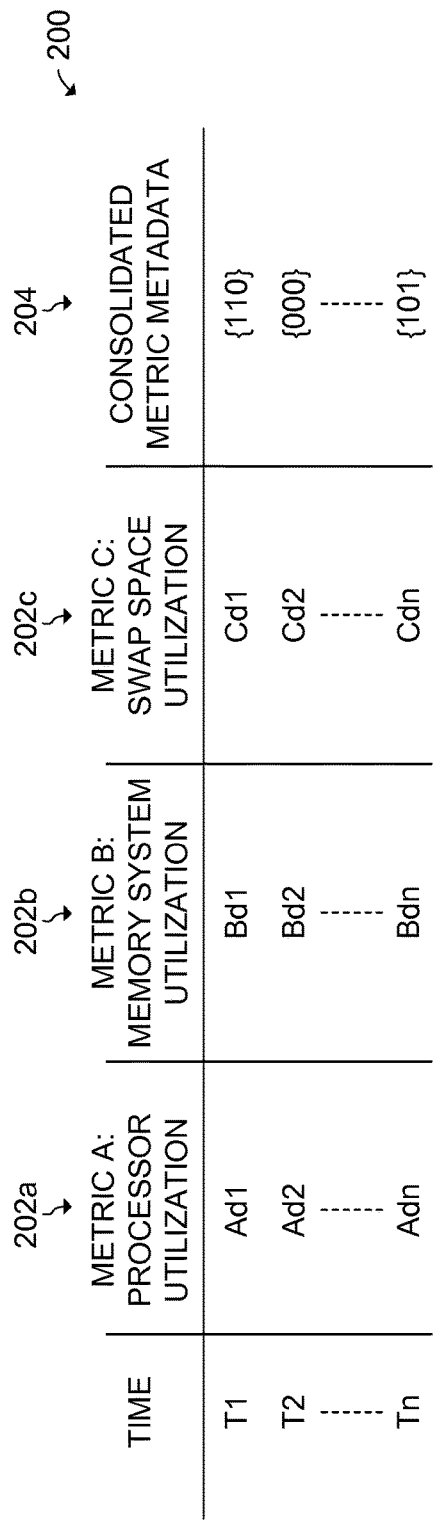

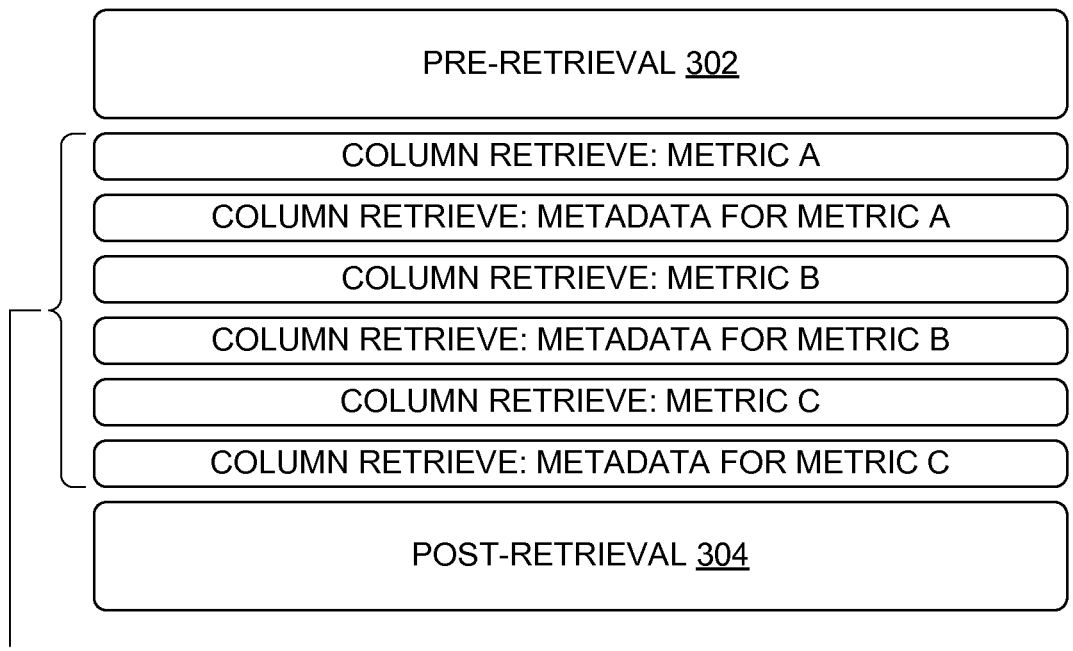
SIX COLUMN OPERATIONS
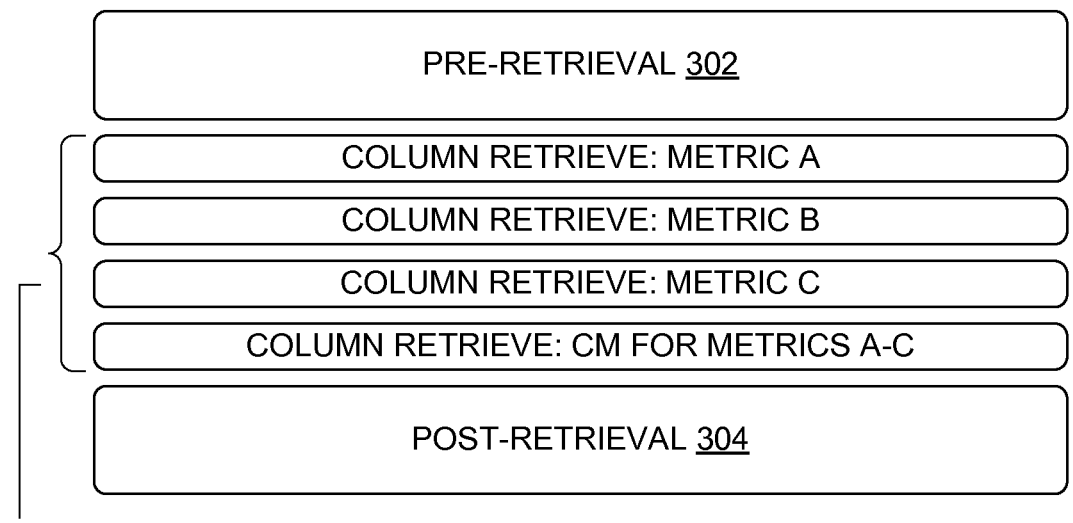
FOUR COLUMN OPERATIONS
FIG. 3

CONSOLIDATED METADATA IN DATABASES

BACKGROUND

Read-out performance may be a consideration in the design of a database management system. Achieving a desired level of read-out performance may become more challenging as the amount and complexity of data increases. In some cases, for example, columns of data are stored in separate files, which may increase the performance cost of read-out operations directed to multiple columns.

BRIEF DESCRIPTION OF THE DRAWINGS

FIGS. 1A and 1B show example database portions that may respectively be unconsolidated and consolidated with respect to the manner in which they store and provide query access to metadata.

FIG. 1C depicts an example non-transitory computer-readable medium containing instructions executable by a processor to produce a database having a consolidate metadata column.

FIG. 2 depicts an example database portion storing performance metrics and associated metadata which characterizes whether such metrics are out-of-sleeve. The associated metadata may be consolidated into a consolidated metadata column.

FIG. 3 is a simplified depiction of two example database queries that are both targeted to access the same data and associated metadata. The query at the top may be structured to retrieve the metadata from multiple separate metadata columns. The lower query may be optimized, in that it may have a reduced number of column operations due to it being structured to retrieve metadata from a single consolidated metadata column.

DETAILED DESCRIPTION

Figure 4:
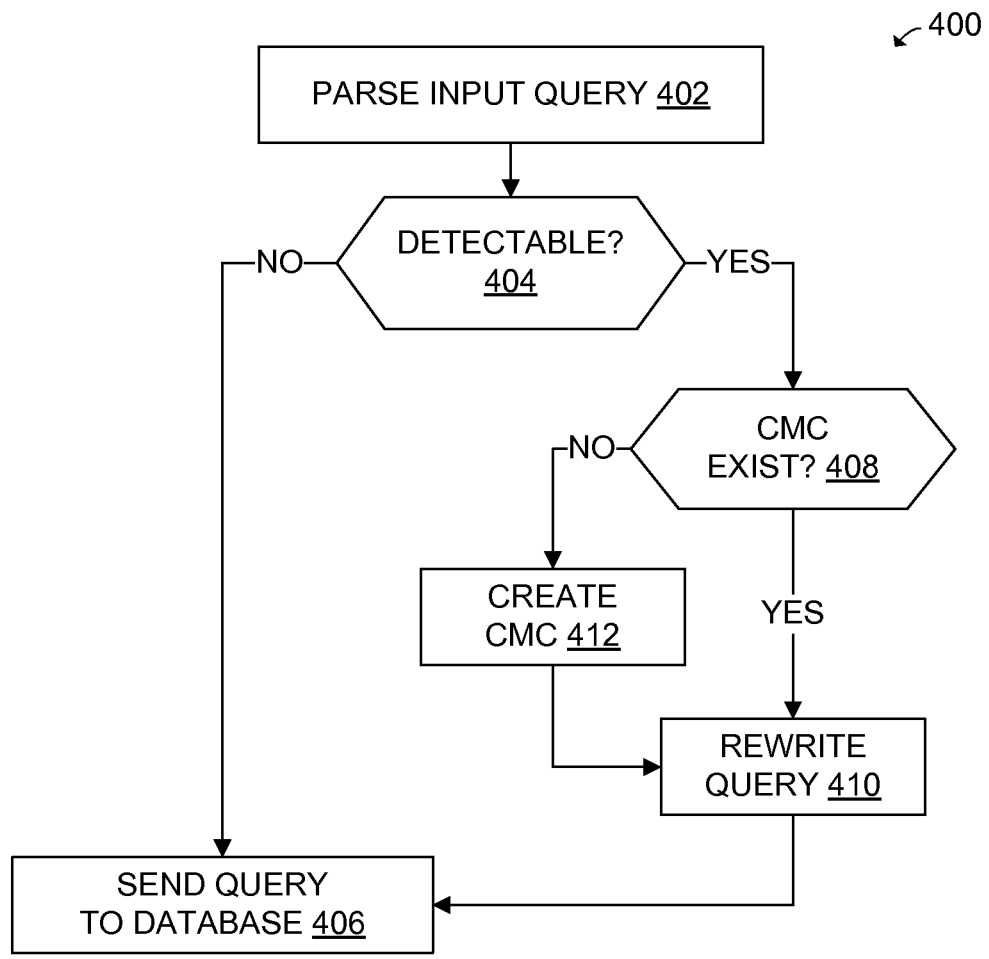
FIG. 4 depicts an example method for handling inbound database queries, converting queries to leverage metadata consolidation in the underlying database, and modifying database portions to optimize metadata access/storage via use of a consolidated structure.

The present description provides examples to structure (and restructure) portions of a database, and handle database queries. In various use scenarios, the described systems, structures and methods may, for example, reduce query complexity, provide faster response times, and reduce the need for high-performing software and hardware resources. However, not all examples may achieve the foregoing. In some examples, desired read-out performance may be achieved, for example in big data analytic settings involving vast amounts of data and an array of specific needs relating to the capture, retrieval and presentation of data.

One example scenario involves capturing an extensive and wide array of metrics, for example metrics that characterize the performance of an information technology platform or other similarly complex system. For example, in a data center setting, thousands of individual metrics might be monitored. Over time, captured metrics may be divided and organized into many different categories, for example based on some common association, and then stored for historical retrieval by query.

Many of the metrics in the example system above could have associated metadata. For example, for a given value of a particular metric, associated metadata might indicate whether the value captured at that time was anomalous, i.e., outside of an expected range. A large number of such metrics might have such an associated metadata characterization of whether the captured information was within or outside of expectations. In some examples, the metadata for each metric is stored in its own dedicated column, which, in many conventional database environments, means that the metadata is in its own file. To clarify, what this means is that for a given group of metrics, the metadata for those metrics is in a column that is in a one-to-one correspondence relationship with the data being characterized. So, if the group of metrics has five metrics, each in its own data column, then there would be five metadata columns (a metadata column for each data column), and potentially each stored in its own file.

Achieving a desired level of read-out performance may become challenging as the amount and complexity of data increases. Indexes and materialized views may provide some level of read-out optimization, but these approaches can be limited, particularly in "big data" environments, analytic solutions, or other settings involving significant read-out challenges.

The present solution proposes, in some examples, an optimization, in which metadata for multiple data columns may be consolidated into a single consolidated metadata column. The solution further proposes, in some examples, dynamic modifications to automatically convert non-consolidated database schemes into consolidated schemes. Still further, the solution proposes, in some examples, an abstraction solution for handling in-bound database queries. Queries that are directed to a non-consolidated structure may be converted, dynamically on-the-fly, into modified queries that are formatted to handle an underlying consolidated structure. Also, in some examples, an in-bound query can prompt and trigger a process by which an underlying database schema is converted from non-consolidated to consolidated. As will be described in more detail, the basic mechanism of consolidation is to embed multiple discrete items of metadata into one database entry, with the individual discrete items mapping onto corresponding entries in an associated data column.

Turning now to the figures, FIGS. 1A and 1B respectively show example database 100a and example database 100b. As will be explained in detail, the databases differ in that database 100b includes a consolidated metadata structure (i.e., employing at least one, in some cases multiple, consolidated metadata columns), whereas the metadata in database 100a is provided in separate columns and therefore is not consolidated. In some examples, the consolidated approach provides increased performance, reduced consumption of storage and other resources, faster query response, and reduced need for high-performing hardware. In some cases, database 100b is originally designed with consolidated metadata columns. In other examples, consolidated metadata columns are created via a modification (automated, in many cases) that consolidates metadata into separate metadata columns.

The relationship between data and its associated metadata will now be described. Database 100a includes a plurality of data columns 102 (102a-102c). Each data column has n entries. In particular, data column 102a has entries Ad1-Adn; data column 102b has entries Bd1-Bdn; etc. Individually associated with each data column is a metadata column 104 (104a-104c). Referring specifically to data column 102a and its associated metadata column 104a, each entry in the metadata column has a corresponding entry in the data column. For example, entry Am2 in metadata column 104a is metadata associated with the corresponding entry Ad2 in data column 102a. The data and associated metadata can take any suitable form in which the metadata is data about, or concerning, the underlying data. In a class of examples below, the metadata provides an indication of whether the associated data deviates from an expected range of values.

Database 100b similarly has multiple data columns 106 (106a-106c). The data columns include the same entries as shown in database 100a (Ad1-Adn; Bd1-Bdn; Cd1-Cdn). However, instead of having a separate metadata column for each data column, database 100b includes a consolidated metadata column 108. Each entry 110 (entries 110_1-110_n) in the consolidated metadata column 108 is consolidated metadata and corresponds to entries in multiple data columns 106. For example, entry 110_1 is consolidated metadata that corresponds to entries Ad1, Bd1 and Cd1.

The consolidated metadata in metadata column 108 can take any practicable form in which metadata for multiple different columns is consolidated into an individual column. In the depicted structure, the consolidated metadata is a tuple having elements that map individually onto the corresponding entries in each of the data columns. Specifically, the tuple of entry 110_1 has three elements (Am1, Bm1, Cm1). Each element maps onto an entry from a different corresponding data column 106. Specifically, element Am1 maps to entry Ad1, element Bm1 maps to entry Bd1, etc. In some cases, the tuple may be implemented as a bit array. In some cases the bit array will have multiple bits for each corresponding entry in the plurality of data columns. By contrast, in some examples, a bit array may be employed in which each element is a single bit.

It will be appreciated that the databases depicted in FIGS. 1A, 1B and 2 are database portions that are extremely simplified relative to real-world use scenarios. A typical database will have thousands, perhaps millions of records, spanning a large number of related tables and supporting files. Furthermore, the concepts elucidated herein are applicable to a wide range of schema types, including columnar, row-based and other models.

As described below, the examples herein can be carried out using various types of storage mechanisms, including non-transitory computer-readable mediums. Such mediums may include instructions that carry out various actions when executed by a processor. In one example, instructions cause a processor to modify a database to include a consolidated metadata column (e.g., modify a database having a structure similar to database 100a so that it has a consolidated metadata structure similar to database 100b). FIG. 1C provides such an example, i.e., a non-transitory medium with instructions that carry out a modification to produce a consolidated metadata structure.

Specifically, FIG. 1C shows a non-transitory computer-readable medium 120 holding instructions 122. When executed by a processor, instructions 122 may modify a database 124 to yield a modified database 126 having a consolidated metadata column, in addition to or instead of multiple separate metadata columns. As shown, the modified database may have multiple data columns 130 (130a, 130b . . . 130n). Each data column has multiple entries, for example data column 130a has i row entries 130a1, 130a2 . . . 130ai. Each entry in the data column has associated metadata which, in general terms, is "data about the data." For example, the metadata for a data column entry may indicate whether the data column entry falls within a specified range of values, whether it exceeds a threshold, whether it satisfies or fails a test, etc. Modified database 126 may also include a consolidated metadata column 132. Each entry in the consolidated metadata column (i.e., entries 132_1, 132_2 . . . 132_i) includes consolidated metadata. As described above, this means that each entry in the consolidated metadata column includes metadata for data column entries from multiple data columns. In FIG. 1C, entry 132_1 includes metadata for the first row entries of data columns 130a, 130b . . . 130n; entry 132_2 includes metadata for the second row entries of data columns 103a, 130b . . . 130n; etc. The consolidated entries may take various forms, as described above (tuple, bit array, etc.)

It will be appreciated that many database models place data from columns in individual files. Accordingly, when metadata for multiple different data columns is provided in a single consolidated metadata column, retrieval of the metadata involves accessing only one file, instead of many. In general, the metadata consolidation described herein may, for example, enable faster query response times, reduced storage needs, reduced need for high-performing hardware and software resources, etc.

The consolidated metadata approach may be employed in analytic systems. One such system, and which will be described below in various examples, is a database structure designed to operate in a "big data" environment and capture a range of metrics. One such example is the capture and analysis of metrics about an information technology system/environment. Example metrics may include CPU server utilization; I/O operation; memory performance and events; consumption of specific network resources; response times; saturation of specific resources; and swap space utilization. This is a very short list of potential metrics. In an extensive real-world system, thousands of relevant metrics might be monitored. Such metrics might be repeatedly captured (e.g., every few seconds or minutes), such that over time the database might grow to a point to include hundreds of thousands, perhaps even millions, of entries/records.

Given such a vast amount of data, and the complex and extensive data structures and code required to enable efficient reading, writing and storage, underlying database schemas must strike a balance between read-in and read-out performance. In many cases, however, read-out performance will somewhat take precedence. In the big-data analytics environment outlined above, existing approaches for improving read-out performance include indexes and materialized views. However, the performance provided by these methods is often limited and sub-optimal, especially in the case of very large and continuously growing and changing datasets.

In the IT metric example above, one purpose of the database system might be to provide a unique type of view of the data which is being represented. For example, it can be helpful to understand if a metric (e.g., utilization of particular server) is in an abnormal state with respect to its expected baseline values. Additionally, there may be requirements to understand future values, meaning an analytic system may be used to predict how the metrics will behave or trend in the future.

Providing these metric-understanding capabilities at query time can require implementation of costly, high-performance solutions, such as high-performing hardware disks, large and fast memory resources, database clusters with high rates of IOPS and CPU processing power, etc. Such costly resources can increase total cost of operation and reduce product revenue. To reduce operational costs, poor performing queries may be eliminated where possible.

One approach to reduce the needs for high performing hardware while not causing performance degradation is to execute metric calculations offline. An example of this is creating offline baseline calculations, for example a set of specific calculations which run periodically and calculate the sleeve for bulks of metrics. When new data-in samples arrive they may be aggregated on top of the existing offline data results and then updated sleeve values may be loaded to the target database table.

Another example for such enrichment, or aggregation, is the calculation of abnormal state of specific metrics. This process is part of data-in enrichment, meaning that the process checks data-in values for anomalous behavior, specifically for metric values that are outside their normal behavior (sleeve). This check may be done on top of baseline results that were calculated offline. If the calculation process finds continuous breaches, it may then set the status column for that metric to true, otherwise it will be set to false. In these examples, the status column is the metadata associated with the given metric. For example, assume server utilization as a metric. Further assume a defined time window as a peak/high usage period, and that an offline-calculated sleeve of values for server utilization during the peak period has been determined (i.e., an upper end value and a lower end value for that time window). A metadata column for this metric would include entries that are TRUE/FALSE indicators of whether the server utilization is out-of-sleeve. In other words, for each value of the metric captured during the peak usage window, the metadata column would include an indicator of whether that server utilization value was out of range.

Referring now to FIG. 2 and the ensuing description, an IT metric example will be described in which consolidated metadata is used to improve database performance. Database 200 includes multiple data columns 202 (202a-202c), each of which are associated with a performance metric of an IT system. The depicted metrics (Metrics A-C) include processor utilization; memory system utilization; and swap space utilization (all three metrics relating, for example, to a server or group of servers). The entries for each column correspond to the values of that metric captured at a given point in time, i.e., time 1, time 2, . . . time n. In addition to instantaneous captured values for the metrics, online or offline calculations may result in metric sleeves, i.e., a range of values for a metric under a given set of conditions. Any sleeve conditions may be employed.

Database 200 also includes a consolidated metadata column 204. In the present example, the entries of the consolidated metadata column are tuples, more specifically a tuple having individual bits as elements, each element-bit mapping to a corresponding entry in one of the data columns. In the depicted example, the bit values correspond to an indication of an anomalous, out-of-sleeve value. For example, a bit value of 1 corresponds to an out-of-sleeve value. A bit value of 0 is within-sleeve. Referring to the first entry of consolidated metadata column 204 (i.e., entry for time T1), the three-bit tuple indicates that, at time T1, processor utilization and memory utilization are anomalous, while swap space utilization is within sleeve. At time T2, the consolidated metadata column entry indicates all three metrics as being within-sleeve.

As in the example of FIG. 1B, database 200 employs a consolidated metadata structure. This can lead to faster query performance, reduced storage requirements, simpler query structures, reduced need for higher-performing hardware and other resources, etc. In some cases, database 200 may be initially defined and structured to employ consolidated metadata. In other examples, a structure involving separate metadata columns may be converted, enhanced, etc., so that at least some metadata columns are consolidated into a single column.

Some of the potential effects of the consolidated metadata column definition may be further understood via consideration of example database queries 300a and 300b (FIG. 3), both of which are directed at retrieving the same data (i.e., data from multiple data columns, and the metadata associated with those data columns). Both databases include pre-retrieval 302 and post-retrieval 304 operations/instructions. In the context of FIG. 3, pre- and post-retrieval refer to operations/instructions that respectively precede and follow the main data fetch instructions of the query, i.e., the instructions that retrieve data from columns of the database. Database query 300a is structured conventionally on an assumption that sought-after metadata for multiple data columns is present in separate metadata columns. As such, the retrieval operations include a metadata column fetch for each data column. Specifically, data is retrieved from three data columns for metrics A-C, and associated metadata is retrieved from three separate columns (i.e., one metadata column for each data column), each of which are individually associated with one of the metric columns. Data is retrieved from six columns. By contrast, query 300b is directed to a consolidated metadata structure. As such, only one column fetch is required to retrieve metadata for all three of the metrics.

FIG. 4 depicts an example method of operating a database. For example, the method may be for handling database queries and manipulating a database in a manner in accordance with the consolidated metadata approaches described above. Method 400 first includes, at 402, receiving and parsing an input database query. In some cases, the received query may be structured in a manner cognizant of a consolidated metadata structure present in the underlying database. In other cases, the query will be structured on an assumption that metadata resides in multiple different metadata columns. As will be described in detail below, such a query may be restructured to account for a consolidated metadata scheme. This can provide the performance features discussed above (i.e., performance associated with a consolidated metadata structure), and may also allow a user to use the consolidated structure without even needing to be aware of it and without having to explicitly structure the query to account for the single-column consolidated structure.

At 404, method 400 includes determining whether the database, or database portion, to which the query is directed, is "detectable." In some cases, this means determining whether the underlying database is configured to permit the consolidated feature. In other cases, this means determining whether an administrator has tagged the database or database portion as being allowed to use the consolidated metadata feature. If the determination at 404 is negative, the query is passed without modification to the database, as shown at 406.

On the other hand, in the event of an affirmative determination at 404, processing flow moves to 408, where a determination is made as to whether a consolidated metadata column (CMG) exists for the metadata being sought. If metadata is consolidated, processing proceeds to 410, where the received database query is restructured so as to operate in a more optimized manner. Specifically, the restructuring may be to cause the modified query to pull the sought-after metadata from the consolidated metadata column, instead of using the initial query structure aimed at multiple columns. FIG. 3 depicts an example of such a restructuring. Upon receiving query with a structure similar to that of 300*a* and determining that it seeks metadata that is embedded within a consolidated metadata column, the system may automatically, dynamically, and on-the-fly, convert the query into something having the optimized structure of query 300*b*.

A further feature of method 400 may be seen at 412. Flow arrives at 412 in response to determining that the metadata being sought by the query is not consolidated. In other words, a consolidated metadata column does not exist for the metadata being sought. In response, at 412, the method includes modifying the underlying database so as to consolidate metadata from two or more separate columns into a single consolidated metadata column. Such modification may include aggregation of any number of separate metadata columns, and the separate columns may thereafter remain intact and be updated, or the separate columns may be deleted from the database in favor of using the consolidated column exclusively. Then, processing flow proceeds to 410, where the inbound query is restructured to account for the newly-implemented consolidation, and is then sent to the database for query processing (406).

Figure 5:
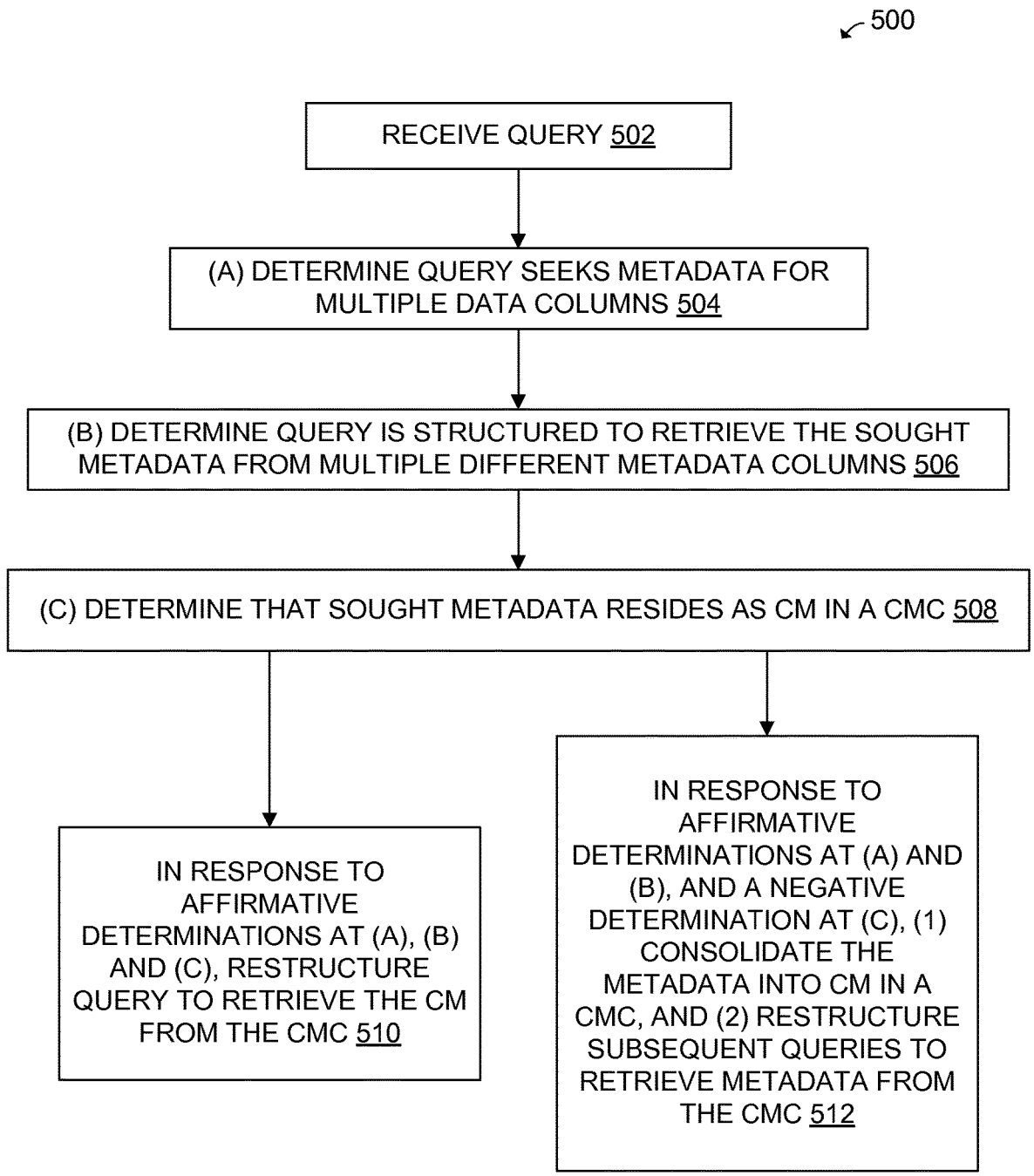
FIG. 5 depicts an example method for processing inbound database queries and performing database operations to provide optimizations relating to metadata consolidation.

Another example method is depicted at 500 in FIG. 5. At 502, an inbound database query is received. At 504, the method includes determining whether the query seeks metadata for multiple data columns. At 506, the method includes determining whether the inbound query is structured to retrieve the sought-after metadata from multiple different metadata columns (i.e., is the query un-optimized with respect to a database allowing the consolidated structuring described herein). In other words, the query may be structured to retrieve metadata other than from a consolidated metadata column. At 508, the method includes determining whether the sought-after metadata resides as consolidated metadata in a consolidated metadata column. At 510, in response to affirmative determinations at 504, 506 and 508, the method includes restructuring the inbound query to retrieve the sought-after metadata from the consolidated metadata column. FIG. 3 is an example of such a restructuring, i.e. the inbound query is converted from the multiple-column metadata fetch of query 300*a* to the format of query 300*b*, which pulls metadata for multiple different metadata columns from a single consolidated metadata column.

Another example processing flow is shown at 512. Specifically, in the event that an inbound query seeks metadata for multiple different data columns, and that the metadata is not available from or in a consolidated structure such as that described herein, the database may be restructured in part, similar to the operations at 412 of FIG. 4. Specifically, the metadata being sought from multiple different metadata columns is consolidated into a single consolidated metadata column.

In some examples, the methods and processes described herein may be tied to a computing system. In particular, such methods and processes may be implemented as a computer-application program or service, an application-programming interface (API), a library, and/or other computer-program product.

Figure 6:
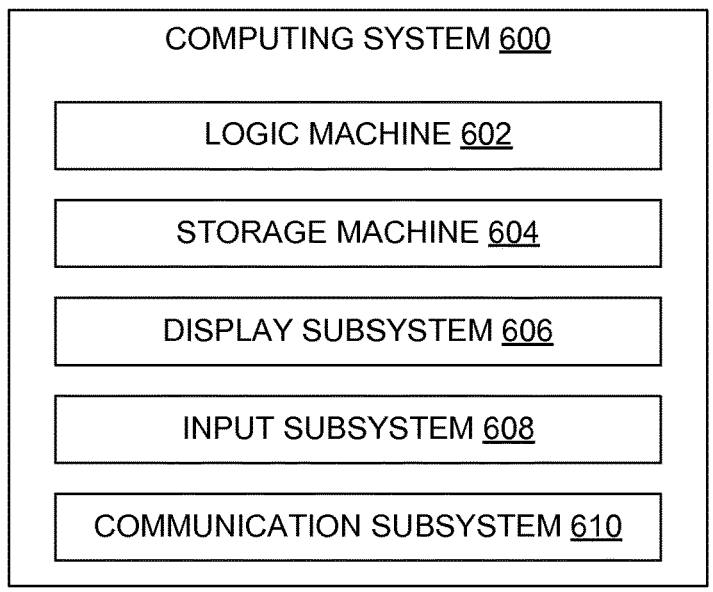
FIG. 6 depicts an example computing system that may be used in connection with the systems and methods depicted and described herein.

FIG. 6 schematically shows a non-limiting example of a computing system 600 that can enact the methods and processes described above. Computing system 600 is shown in simplified form. Computing system 600 may take the form a personal computer or computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes at least one physical device configured to execute instructions. For example, the logic machine may be configured to execute instructions that are part of singular or plural applications, services, programs, routines, libraries, objects, components, data structures, or other logical constructs. Such instructions may be implemented to perform a task, implement a data type, transform the state of component(s), achieve a technical effect, or otherwise arrive at a desired result.

Example instructions that may be executed by computing system 600 include: (1) consolidating metadata from multiple separate metadata columns into a single consolidated metadata column, e.g., 412 of FIG. 4 and 512 of FIG. 5; (2) parsing input queries to determine whether they are structured to pull metadata from multiple different metadata columns or from a consolidated metadata column, e.g., 506 of FIG. 5; (3) determine whether an inbound query seeks metadata for multiple data columns, e.g., 504 of FIG. 5; (4) restructure inbound queries so that, instead of seeking metadata from multiple metadata columns, they seek the metadata from a single consolidated metadata column, e.g., 510 of FIG. 5; etc. These are but examples—hardware, instructions (e.g., software and/or firmware) may be used to carry out any of the operations described herein.

The logic machine may include a processor(s) configured to execute instructions (e.g., software). Additionally, the logic machine may include hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes a physical device(s) configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 a physical device (or devices). However, aspects of the instructions described herein may be propagated by a communication medium (e.g., an electromagnetic signal, an optical signal, etc.) that is not held by a physical device for a finite duration. Storage machine may constitute a non-transitory computer readable medium for storing the example databases described herein.

Aspects of logic machine 602 and storage machine 604 may be integrated together into hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to system components, programs, and/or other services. In some implementations, a service may run on server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include display devices utilizing virtually any type of technology. Such display devices may be combined with logic machine 602 and/or storage machine 604 in a shared enclosure, or such display devices may be peripheral display devices.

When included, input subsystem 608 may comprise or interface with user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with other computing devices. Communication subsystem 610 may include wired and/or wireless communication devices compatible with different communication protocols. As non-limiting examples, the communication subsystem may be configured for communication via a wireless telephone network, or a wired or wireless local- or wide-area network. In some examples, the communication subsystem may allow computing system 600 to send and/or receive messages to and/or from other devices via a network such as the Internet.

Figure 7:
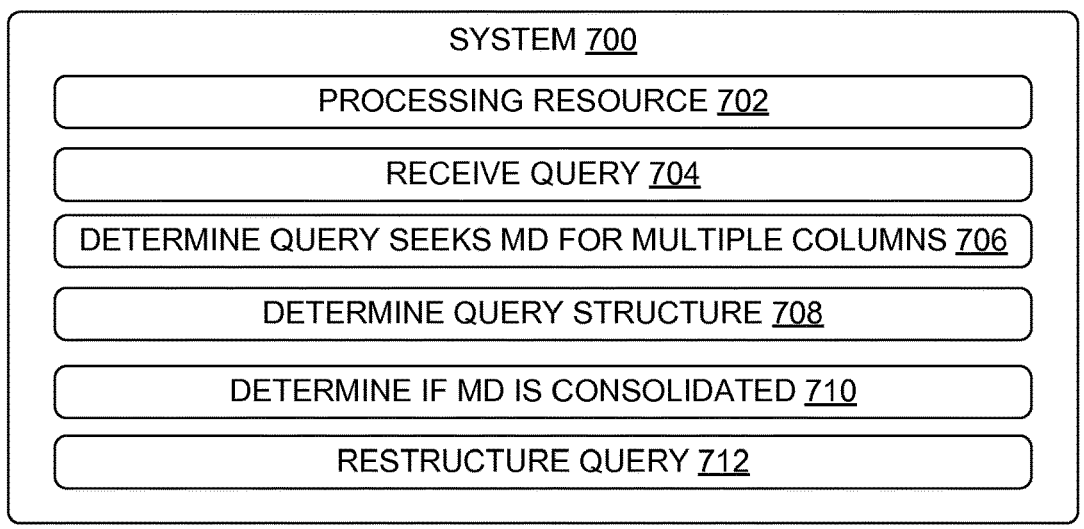
FIG. 7 depicts an example system with a processing resource to receive and respond to database queries.

In some examples, a system is provided for receiving database queries and responding to those queries. In some examples, the response may include restructuring the received query, restructuring the underlying database, or both. In some examples, and as shown in FIG. 7, such a system 700 may include a processing resource 702. The processing resource may include circuitry or other hardware; a processor and associated executable instructions; etc. Still further, the processing resource may include some of the characteristics described in connection with logic machine 602 and other components of example computing system 600 of FIG. 6.

Continuing with FIG. 7, the processing resource 702 may carry out various acts in connection with database queries. Such acts may include receiving a database query that requests data from a database (704); determining whether the query seeks metadata for multiple different data columns (706); determining whether the query is structured to retrieve the sought-after metadata from multiple different metadata columns (708); and determining whether the sought-after metadata is consolidated into a single consolidated metadata column. If the determinations of 706, 708 and 710 are determined in the affirmative, the processing resource may then restructure the received data base query so that it retrieves the sought-after metadata by retrieving the consolidated metadata from the consolidated metadata column.

Processing resource 702 may also be implemented to carry out various other operations, including operations shown in FIGS. 4 and 5. For example, if the determination at 710 is that the sought-after metadata is not embedded into a single consolidated metadata column, the processing resource may cause a modification to the underlying database. Specifically, the processing resource may cause metadata residing in multiple separate metadata columns to be consolidated into a consolidated column.

Figure 8:
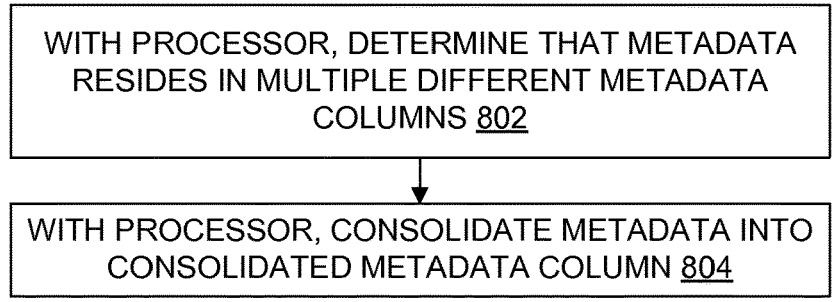
FIG. 8 depicts an example method for consolidating metadata from multiple different columns into a single consolidated metadata column.

A further example method relating to consolidated metadata is shown at 800 in FIG. 8. Method 800 may be operated in the context of a database that is at least partly unconsolidated. In other words, the database has multiple data columns, with the metadata for each data column being stored in its own separate metadata column. For example, there might be a one-to-one relationship in which each data column has its own separate metadata column. In any case, method 800 may include, at 802, determining, with a processor, that metadata for a plurality of data columns resides in multiple different metadata columns. In the event that such an unconsolidated structure exists, the method may include, at 804, using the processor to consolidate metadata. Specifically, the metadata for each of the multiple different data columns is consolidated into a single metadata column. Method 800 may also include elements similar to those shown in FIGS. 1C, 4, 5 and 7. For example the method may include restructuring database queries so that they retrieve consolidated metadata instead of seeking it from multiple separate metadata columns. In other examples, the consolidation of 804 may be triggered by or performed in response to receiving a certain type of database query.

It will be understood that the configurations and/or approaches described herein are exemplary in nature, and that these specific examples are not to be considered in a limiting sense, because numerous variations are possible. The specific routines or methods described herein may represent any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A non-transitory computer-readable medium comprising instructions that when executed cause a system to:
   access a first database comprising a plurality of data columns associated with corresponding separate metadata columns comprising metadata elements,
      each metadata column of the separate metadata columns comprising a respective metadata element of the metadata elements, and
      each metadata column of the separate metadata columns is associated with a respective data column of the plurality of data columns; and
   create a second database based on consolidating the metadata elements of the separate metadata columns of the first database, each metadata column of the separate metadata columns comprising the respective metadata element of the metadata elements, into a consolidated metadata column of the second database, the second database further comprising the plurality of data columns and a plurality of rows, wherein a first row of the plurality of rows comprises:
      a first tuple of the consolidated metadata column, and entries of the plurality of data columns,
      wherein the first tuple comprises metadata elements of the separate metadata columns of the first database, and
      wherein a first metadata element of the metadata elements in the first tuple maps to an entry of a first data column of the plurality of data columns in the first row of the second database, and a second metadata element of the metadata elements in the first tuple maps to an entry of a second data column of the plurality of data columns in the first row of the second database.

2. The non-transitory computer-readable medium of claim 1, wherein a second row of the plurality of rows of the second database comprises:
   a second tuple of the consolidated metadata column, and entries of the plurality of data columns,
   wherein the second tuple of the consolidated metadata column comprises further metadata elements of the separate metadata columns of the first database, and
   wherein a first further metadata element of the further metadata elements maps to an entry of the first data column in the second row of the second database, and a second further metadata element of the further metadata elements maps to an entry of the second data column in the second row of the second database.

3. The non-transitory computer-readable medium of claim 1, wherein the first tuple is a bit array having a bit for each corresponding data column of the plurality of data columns of the second database.

4. The non-transitory computer-readable medium of claim 1, wherein the second database is a modified version of the first database.

5. The non-transitory computer-readable medium of claim 1, wherein the instructions when executed cause the system to:
   receive a database query to access data of the plurality of data columns,
   wherein the creating the second database is in response to the database query.

6. The non-transitory computer-readable medium of claim 5, wherein the database query is structured to access metadata for the plurality of data columns in the separate metadata columns, and wherein the instructions when executed cause the system to:
   convert the database query to a modified database query structured to access metadata from the plurality of data columns in the consolidated metadata column.

7. The non-transitory computer-readable medium of claim 1, wherein the first data column comprises first metric data for a first information technology (IT) resource, the second data column comprises second metric data for a second IT resource, the first metadata element comprises a first status indicator based on the first metric data, and the second metadata element comprises a second status indicator based on the second metric data.

8. The non-transitory computer-readable medium of claim 7, wherein the instructions when executed cause the system to:
   determine whether utilization of the first IT resource and the second IT resource is out of range based on accessing the first status indicator and the second status indicator in the consolidated metadata column.

9. A system comprising:
   a processor; and
   a non-transitory storage medium comprising instructions executable on the processor to:
   receive a database query requesting data from a database;
   determine whether the database query is structured to retrieve metadata for a plurality of data columns from separate metadata columns, each metadata column of the separate metadata columns comprising a respective metadata element of the metadata;
   determine whether the metadata for the plurality of data columns resides in the database as consolidated metadata in a consolidated metadata column that consolidates metadata elements from the separate metadata columns,
      the consolidated metadata column comprising a first tuple comprising a first plurality of metadata elements,
      wherein a first metadata element of the first plurality of metadata elements maps to an entry of a first data column of the plurality of data columns in a first row of the database, and
      a second metadata element of the first plurality of metadata elements maps to an entry of a second data column of the plurality of data columns in the first row of the database; and
   in response to determining that the database query is structured to retrieve the metadata for the plurality of data columns from the separate metadata columns and determining that the metadata for the plurality of data columns resides in the database as the consolidated metadata in the consolidated metadata column, restructure the database query to retrieve the consolidated metadata from the consolidated metadata column.

10. The system of claim 9, wherein the instructions are executable on the processor to, in response to determining that the database query is structured to retrieve the metadata for the plurality of data columns from the separate metadata columns and determining that the metadata for the plurality of data columns does not reside in the database as the consolidated metadata in the consolidated metadata column, consolidate the metadata elements from the separate metadata columns into the consolidated metadata in the consolidated metadata column.

11. The system of claim 9, wherein the consolidated metadata column comprises a second tuple including a second plurality of metadata elements, wherein a third metadata element of the second plurality of metadata elements maps to an entry of the first data column in a second row of the database, and a fourth metadata element of the second plurality of metadata elements maps to an entry of the second data column in the second row of the database.

12. The system of claim 9, wherein the first tuple is a bit array having a bit for each corresponding data column of the plurality of data columns.

13. A method comprising:
   accessing, by a system comprising a hardware processor, a database comprising a plurality of data columns and separate metadata columns comprising metadata elements, the separate metadata columns associated with corresponding data columns of the plurality of data columns,
      each metadata column of the separate metadata columns comprising a respective metadata element of the metadata elements, and
      each metadata column of the separate metadata columns is associated with a respective data column of the plurality of data columns; and
   consolidating, by the system, the metadata elements in the separate metadata columns into consolidated metadata that resides in a consolidated metadata column of the database,
      wherein the consolidated metadata column comprises a first tuple including a first plurality of metadata elements of the separate metadata columns, and
      wherein a first metadata element of the first plurality of metadata elements maps to an entry of a first data column of the plurality of data columns in a first row of the database, and a second metadata element of the first plurality of metadata elements maps to an entry of a second data column of the plurality of data columns in the first row of the database.

14. The method of claim 13, further comprising:
   receiving a database query structured to retrieve metadata for the plurality of data columns from the separate metadata columns; and
   restructuring the database query to retrieve the metadata for the plurality of data columns from the consolidated metadata column.

15. The method of claim 14, wherein the consolidating is responsive to the database query.

16. The method of claim 13, where the consolidated metadata column comprises a second tuple including a second plurality of metadata elements, wherein a third metadata element of the second plurality of metadata elements maps to an entry of the first data column in a second row of the database, and a fourth metadata element of the second plurality of metadata elements maps to an entry of the second data column in the second row of the database.

17. The method of claim 13, wherein the first tuple is a bit array having a bit for each corresponding data column of the plurality of data columns.

18. The method of claim 13, further comprising:
   deleting the separate metadata columns from the database after the consolidating.

19. The method of claim 13, wherein the first data column comprises first metric data for a first information technology (IT) resource, the second data column comprises second metric data for a second IT resource, the first metadata element comprises a first status indicator based on the first metric data, and the second metadata element comprises a second status indicator based on the second metric data, the method further comprising:
   determining whether utilization of the first IT resource and the second IT resource is out of range based on accessing the first status indicator and the second status indicator in the consolidated metadata column.

* * * * *